March 19, 1946. R. L. GLOVER 2,396,693
DRY CELL AND PROCESS FOR MANUFACTURING THE SAME
Filed April 18, 1942
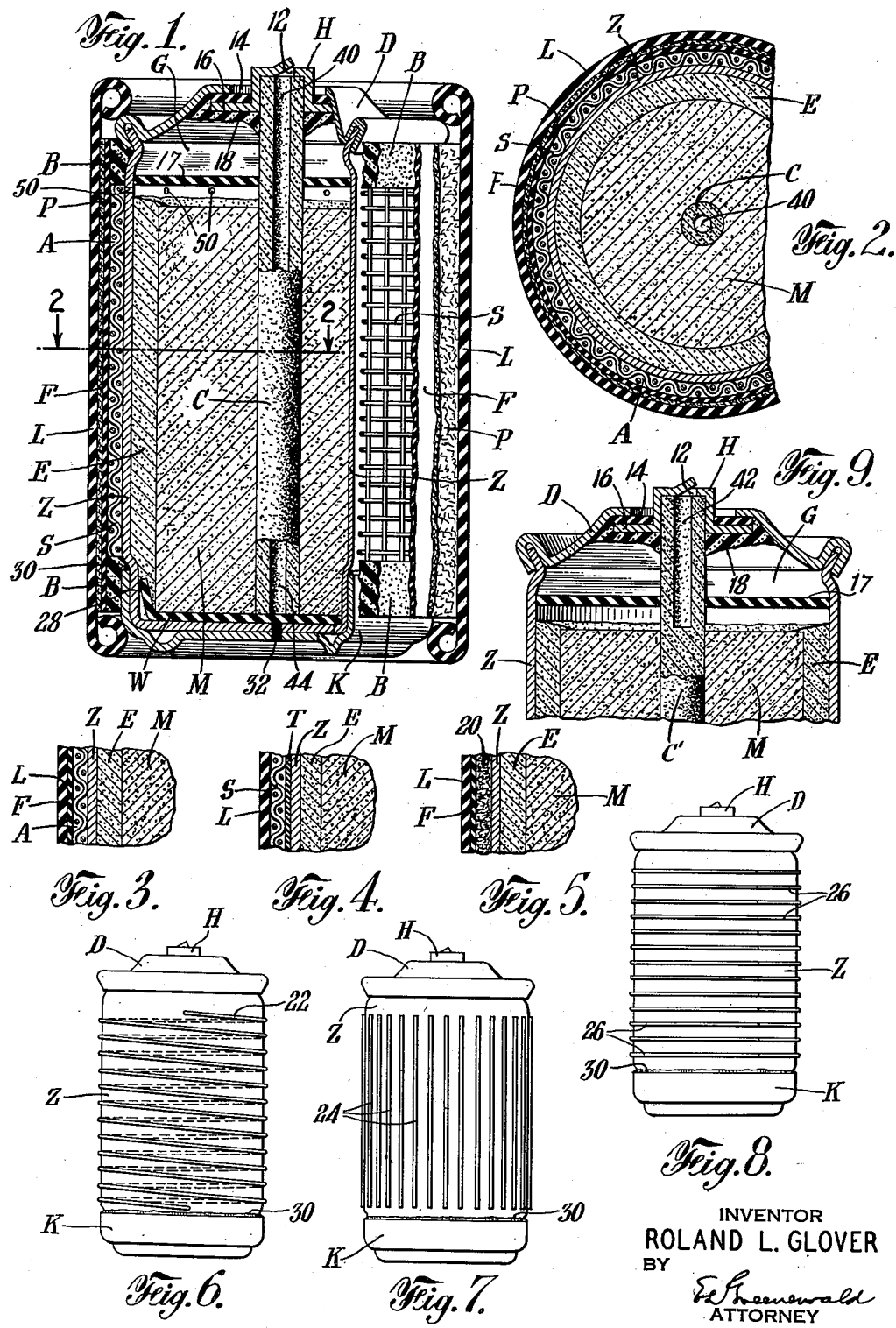
INVENTOR
ROLAND L. GLOVER
BY
Ed Greenewald
ATTORNEY Patented Mar. 19, 1946

2,396,693

UNITED STATES PATENT OFFICE 2,396,693

DRY CELL AND PROCESS FOR MANUFACTURING THE SAME

Roland L. Glover, Lakewood, Ohio, assignor to National Carbon Company, Inc., a corporation of New York Application April 18, 1942, Serial No. 439,458

16 Claims. (Cl. 136—133)

This invention relates to galvanic cells and more particularly to so-called dry cells of the Leclanche type and to processes for manufacturing the same.

In dry cells of the Leclanche type the liquid electrolyte is usually immobilized in a paste, or in absorbent material such as paper. Generally, these cells comprise a zinc can or container electrode; a carbon electrode disposed centrally within and spaced from the container electrode; an electrically conductive mix comprising depolarizing material and carbon particles, wet with electrolyte, in which the inner end of the carbon electrode is embedded; and a bibulous electrolyte-immobilizing material between the mix and the container electrode. A cover member or cap is secured to the container electrode and to the central electrode and, preferably, suitable sealing means between the electrodes and the cap are provided above the electrolyte and the mix. The sealing means is usually spaced from the active ingredients whereby a gas space is provided adjacent the top of the cell.

The effective operation of such a cell requires that the electrolyte and the electrodes be maintained in good condition except for the normal consumption of cell materials during use. If the electrolyte dries out or oozes out of the cell, the cell rapidly deteriorates. The electrolyte may perforate the container electrode and thus be lost by leakage through such perforations in the container electrode, or may creep across the joints between either or both electrodes and the cap or cover member, and thereby destroy the effectiveness of the cell.

Various expedients have been resorted to in an attempt to overcome or to prevent these conditions from arising. Such expedients have included a waterproof jacket around the cell, or a metal jacket in which the cell assembly, as a unit, is placed. The first expedient has the objectionable feature that the generation of gas within the cell will cause perforation of the container after corrosion of the zinc electrode, thereby destroying its effectiveness or causing the cell to become irremovably lodged in a flashlight, for instance. The second expedient is objectionable in that it increases the weight of the cell and also considerably increases the expense of manufacturing the same. Both constructions usually involve a decrease in the dimensions of the container electrode, which dimensions govern the current producing capacity of the cell.

It is among the objects of this invention to provide an improved galvanic cell of the dry type in which deleterious effects of electrolyte leakage are minimized; to provide a cell in which an effectively distributed confined expansion space is provided around the container electrode but within the outer wrapping of the cell and requiring no increase in the size of the finished cell or decrease in the size of the container electrode; to provide such a cell having room for increase in volume of its active constituents due to electrochemical reactions within the cell; to provide such a cell having a confined space to hold liquid exudates resulting from cell action; to provide such a cell in which an outer wrapping is held at a uniformly fixed distance from the container electrode to provide a confined space to receive moisture exuding from the cell; to provide such a cell in which a waterproof or electrolyte-proof film between the outer electrode and the cell wrapping prevents escape of moisture through the cell wrapper; to provide such a cell in which a zinc or container electrode having a relatively thin wall may be used, thereby resulting in economy of the zinc; to provide a dry cell including a complete container for the active ingredients of the cell, which container is independent of the container electrode; to provide a tightly sealed dry cell in which venting is accomplished through a hollow electrode; and to provide methods of manufacturing such cells.

The invention will be described with reference to the accompanying drawing, in which:

Fig. 1 is an elevation, partly in section, illustrating one embodiment of the invention;

Fig. 2 is a cross-sectional view taken on the line 2—2 of Fig. 1, and looking in the direction of the arrows;

Figs. 3, 4, and 5 are sections of portions of dry cells illustrating details of several modifications of the cell shown in Figs. 1 and 2;

Figs. 6, 7, and 8 are views in elevation illustrating various modes of applying spacing means to the container electrode of the cell; and Fig. 9 illustrates a typical unit dry cell which may be used with the invention and which embodies a modified form of carbon electrode.

According to the present invention, a uniformly thick and uniformly distributed spacing material and an electrolyte-proof film are applied around the exterior of the container electrode of a dry cell, such as a unit cell used for flashlights, and the customary wrapper or label is placed outside the electrolyte-proof film. The film is sealed at its upper and lower ends to the container electrode, thereby forming with the wall of container electrode a confined space sealed against egress of liquid. The spacing material ensures a substantially uniformly distriubted expansion space between the outer wrapper and the container electrode, which space is adapted to receive moisture or electrolyte which may exude from the cell. The electrolyte-proof film prevents the moisture or electrolyte exuding from the cell from piercing the outer wrapper or label. Loss of moisture from the cell is also effectively hindered, and the life of the cell is correspondingly increased.

While the principles of the invention are capable of diverse applications to various types of galvanic cells, for purposes of illustration the invention will be described as applied to a typical cylindrical flashlight or unit cell. It is to be understood, however, that the invention is not limited to such cells, but is applicable equally to other cells.

Referring to the drawing, and more particularly to Figs. 1 and 2 thereof, the improved dry cell of the present invention may comprise a cylindrical zinc can or container electrode Z, a cylindrical carbon electrode C disposed centrally within and spaced from the outer electrode Z; a cylindrical mix M, consisting of depolarizing material and conductive carbon particles wet with electrolyte, in which the inner end of the electrode member C is embedded; and a bibulous electrolyte-immobilizing material E between the mix M and the electrode Z. The lower end of the central electrode C is separated from the container electrode Z by an insulating washer W. The immobilizing material E may consist of suitable paste or absorbent material such as paper, and contains electrolyte. A suitable electrolyte, such as an aqueous solution of zinc chloride and ammonium chloride, may be used. The electrode member C preferably consists of a hollow rod of carbon of a porous grade impregnated with a moisture-repellent composition, so that gas generated in the cell will vent through this electrode to the atmosphere but substantially no liquid will escape from the inside of the cell. The particular construction and function of electrode member C is described more fully hereinafter.

The closure of the cell may comprise a relatively thin annular cover member D and a metal cap H. The cap H may be a cup-shaped member of brass or other suitable sheet metal fitting the upper end of the electrode member C, and desirably is provided with a vent hole 12 opposite the top of electrode C. The cover D may consist of relatively rigid but resilient sheet material such as metal, paperboard, fiberboard or molded plastic material; and as shown it consists of thin sheet iron or steel. The outer margin of the cover D preferably is permanently and substantially hermetically sealed to the upper end of the electrode Z, as by tightly rolling or spinning the margin of the cover D over the circular edge of the can Z. The inner margin of the cover D is supported by the electrode member C in a well-known manner, preferably by pressing the cover firmly against an annular washer 14 of moisture-proof and electrical insulating material which is carried by a flange 16 formed on the cap H that is mounted on electrode C. A gas space G is provided by the space between the cover member D and the mix M. A partition 17 of electrically insulating material is provided in the gas space G immediately above the level of the mix M. As shown, suitable sealing means or material 18 may be provided between cover D and electrodes C and/or Z. A typical example of such a construction is shown in Marsal U. S. Patent No. 2,244,016.

As previously explained, during operation of the cell the electrode member Z is attacked, which may result in forming perforations therein and permitting electrolyte or moisture to escape from the cell, thus ordinarily impairing the useful life thereof. Additionally, electrolyte exuding from the cell may establish an undesired conductive path to other cells associated with the leaky cell.

According to the present invention, these undesirable results are avoided by providing a uniformly distributed, sealed expansion space A adjacent the outer surface of the container electrode Z, which space provides room for expansion of the gas and to receive and retain electrolyte or moisture exuded through the container electrode.

The space A is bounded on the inside by the container electrode Z, on the outside by an electrolyte-proof, waterproof surface or film F, and at the top and bottom of the cell by an electrolyte-proof and waterproof material B, which latter preferably is bonded both to the film and to the container electrode. The film F may be carried by a layer of supporting material, such as a thin paper backing P as illustrated in Figs. 1 and 2, or by direct application to the inside surface of the outer label L as illustrated in Fig. 3. To provide an effectively distributed expansion space, the container electrode is wrapped with a layer of uniformly thick and uniformly distributed spacing material S, so constituted and arranged as to provide a large number of voids adapted to collect and retain cell exudate. This material may be, as shown in Figs. 1, 2, and 3, a loosely woven material such as open mesh netting. Alternatively, the spacing material may be a continuous absorbent material such as cellulose wadding, as shown in Fig. 5, or strands 22, 24, or 26 of thread or yarn, as shown in Figs. 6, 7, and 8. The spacing material S offers a substantially uniform support for the film F and the label or outer wrapping L around the entire surface of the cell. Furthermore, the extra space A is uniformly distributed in such a manner around the zinc can electrode Z that it is particularly effective in retaining liquid by-products of cell discharge which may be expelled through perforations in the zinc side wall. The provision of the waterproof and electrolyte-proof film F around the zinc side wall of the can Z, in combination with the bonding material B, materially decreases or prevents loss of moisture from the cell through perforations which normally occur in the zinc can Z of the cell during its useful life.

Another important feature of the invention is the use of the hollow central electrode C, providing a better means for venting gases from the above-described sealed cell construction which will greatly reduce or prevent electrolyte leakage through the vent hole 12 under the internal pressures which may be encountered.

The hollow electrode C is formed of porous carbon partially impregnated with a water repellent. The porous carbon stock can be similar to that described by N. K. Chaney in U. S. Patent No. 1,836,903, and can be partially impregnated with oil as described in the patent. Preferably, and as shown in Fig. 1, a hole or passage 40 may extend axially along the full length of the electrode C, and the carbon structure can be much denser and more electrolyte resistant than that described in Patent No. 1,836,903 without impairing the venting ability of the electrode. The reason a more dense and less porous electrode is possible is because under this invention a shorter radial path for gas being vented is provided through the carbon. It may be made more dense and less porous to offer greater resistance to escape of both liquid and gas without increasing the resistance to gases being vented compared to the gas venting resistance offered by the electrode of the Chaney Patent 1,836,903. As shown in the drawing there are no large holes in the radial walls of the carbon electrode through which liquid might easily escape and through which moisture in the cell may be dried out too quickly. In the form of electrode shown in Fig. 1, it is immaterial to the function of electrode G whether, during insertion of the electrode into the mix M, any mix is forced into the hole or passage 40 at the point 44, so long as gases can be forced from the gas space G through the carbon shell, into the hole or passage 40 and out to the atmosphere through vent hole 12 in cap H.

In the modification of the invention shown in Fig. 4, an elastic rubberlike tube or sleeve T is placed directly in engagement with the zinc electrode Z. The spacing material S is then uniformly distributed on the outside of the elastic tube or sleeve T and the finishing label L is applied over the spacing material S. In action, the elastic tube or sleeve T expands through the interstices of, or spaces between, the spacing material S to provide the space A for exuded moisture or electrolyte.

Various materials may be used for the spacing means S, the electrolyte-proof film F, and the bonding material B. Thus, the spacing material S may be wide mesh woven material, such as used in sacking vegetables, .020 inch thick having a warp of six threads per inch with a thread .011 inch thick and a woof of seven threads per inch with the thread .017 inch thick. Another material is absorbent material such as cellulose wadding .020 inch thick (Fig. 5). Other suitable materials are single fiber, thread, or yarn 22, 24, 26, typically cotton thread .020 inch thick spaced $\frac{3}{32}$ inch apart (Figs. 6, 7, and 8).

The bonding material B may be either asphalt, or asphalt mixtures such as rubber-asphalt or resin-rubber mixtures, or thermoplastic or thermosetting synthetic resins and resin mixtures.

The plastic electrolyte-proof film F may be either a plastic resin or a lastic. By the term "lastic" is meant a material which, at certain temperatures, possesses the elastic stretchable characteristics of rubber, deforming readily under stress and returning to approximately its original dimensions when the stress is removed. A suitable thermoplastic resin is a polymer or a copolymer of a vinyl derivative. This may be in the form of a film calendered directly onto paper and approximately .002 inch thick, or may be a lacquer film 10 M. S. I. on the paper.

The lastic may comprise a plasticized polymer or copolymer of a vinyl derivative, or may comprise rubber.

In making the embodiment of the invention shown in Figs. 1 and 2, any of several methods may be used. In the first method, a wrapper assembly is made and then assembled with a unit flashlight cell to form the cell assembly. Typically, in making a typical unit cell, the electrolyte-proof film F is calendered directly onto white sulphite paper P. The spacing material S, which in this instance may comprise the above described open mesh netting, preferably in a strip somewhat narrower than the coated paper, is coated on one side with a suitable adhesive which may be a vinyl derivative. The coated side of the netting is pressed against the center of the coated paper, so that an uncovered margin of film is left on each edge of the coated paper, and the assembly is baked to drive off solvent and cause the two elements to adhere to each other. The resulting strip of material is slit down the center to provide two laminated strips each having an uncovered margin of film on one edge to provide a smooth sealing lip. Each laminated strip then is cut into units, each unit constituting an individual wrapper.

In making the cell assembly, a typical unit flashlight cell is provided in combination with the above wrapper assembly, with an asphalt mixture, and with a finishing label L. In assembling, the unit cell is rolled across asphalt banding apparatus which applies a band bond B of asphalt to both the top and bottom edges of the cell. The banded cell is then rolled across the above described laminated wrapper assembly, which it picks up in transit, and then across a heating unit designed to flux the asphalt at the top and bottom edges of the cell and also to heat-seal the asphalt to the film and the film on the lap of the wrapper. The resulting wrapped unit is the essence of this invention and the finishing label or outer wrapper is applied to this assembly in the manner deemed most expedient.

The above assembly procedure can be carried out using the following variations: (1) The electrolyte-proof film F may be applied to the paper P in the form of a lacquer; (2) cotton thread spacing material S may be heat laminated onto the plastic film, and (3) various bonding materials may be substituted for the asphalt.

Another method which may be used in making the embodiment of the invention illustrated in Figs. 1 and 2 is to use a sleeve of the electrolyte-proof material F shrunk over the spacing material S. In this method, the unit cell is rolled over strips of adhesive suitable for binding the film to the cell, so that a band of adhesive is applied circumferentially around each end of the container electrode. The banded cell is then rolled over the spacing material, such as the open mesh netting described above. An expanded tube of electrolyte-proof material is then placed over the assembly and shrunk into position, and the finishing label is applied in the most convenient manner.

In making the embodiment of the invention illustrated in Fig. 3 of the drawing, the cell is banded with an asphalt mixture as described above, and around the periphery of the cell is wrapped a piece of spacing material, the top and bottom edges of which are embedded in the bonding material. The electrolyte-proof film F is applied to the inside of the finishing labels, either in the form of a film or in the form of a lacquer. The coated finishing label is then applied to the wrapped unit and is held in place by a waterproof adhesive of a suitable type, such as a polymer or copolymer of a vinyl derivative.

In making the embodiment of the invention illustrated in Fig. 4, the cell is banded with the bonding material as described above, preferably using a thin coat of rubber adhesive instead of asphalt. A piece of rubber tubing T of the same length as the height of the cell is shrunk on the cell and is bonded by the rubber adhesive to the zinc electrode at its top and bottom edges. Over the resulting unit is wrapped the spacing material, such as the open mesh netting, or the threads, and the finishing label is applied to the spacing material. The spacing material must, in this case, provide interstices through which the rubber tubing T may expand. Hence, the absorbent material cannot be used in this construction, which makes use of the elastic properties of the rubber tube which expands through the interstices of the spacing material, thus providing the expansion space.

In the embodiment of the invention illustrated in Fig. 5, an absorbent material 20 such as cellulose wadding having about .020 inch effective thickness is applied in the same manner as described in connection with the application of the open mesh netting.

In the embodiment of the invention illustrated in Fig. 6, a single fiber, thread or yarn 22, such as cotton thread, of .020 inch in thickness, may be wrapped in a helix around the cell with the adjacent convolutions being spaced a short distance apart.

In the embodiment of the invention illustrated in Fig. 7, separate pieces of thread 24 are applied to the cell in a longitudinal or axial direction and the threads are spaced a substantially uniform distance apart. Similarly, in Fig. 8, threads 26 are wrapped circumferentially around the cell and the threads are spaced a substantially uniform distance apart.

Under some severe conditions, the protection against leakage due to the above-described wrapped side wall construction may be impaired by electrolytic action damaging the bottom of the zinc container electrode Z. To prevent this, a metal cap K may be fitted tightly over the bottom end of the container electrode Z, the latter being constricted, as shown at 28, so that, after assembly, the auxiliary metal cap K will not protrude beyond the side wall of electrode Z. The rim of the cap preferably should be soldered to the zinc container, as at 30, providing a positive metal connection. Alternatively, electrode Z and cap K may be spot welded, as at 32, to provide a satisfactory connection, or contact can be effected by a tight push fit, the last, however, being the least desirable expedient.

The cap K is an important feature of the present invention as, in conjunction with the wrapped side wall, it completes a container for the active ingredients of the cell which container is independent of the bottom of the zinc container electrodes. Preferably, the cap K should be made of metal less active than zinc, such as terneplate, tinplate or cadmium plated steel, as such metals will not be attacked significantly so long as zinc is present for electrochemical protection. After the zinc has been completely exhausted, action on such metals will proceed very slowly. Zinc, however, can be used for the cap K and does afford protection for a time, but the cap K will be less durable as the zinc may also be utilized electrolytically.

The electrode C' of Fig. 9 represents a modification in which a hole or passage 42 extends axially of the electrode only in that portion which is in contact with the gas space G of the cell, that portion of the electrode C' embedded in the active ingredients of the cell being solid. The functioning of the hollow electrode as a vent is not impaired so long as the axial hole or passage extends through that portion of the electrode in contact with the gas space G of the cell.

In practicing the invention, it has been found that gas venting from the tightly sealed gas space G of the cell encounters only a fraction of the resistance in a hollow electrode that it does in a solid electrode of the same stock. A five-fold reduction in the resistance is readily achievable. Accordingly, an original stock having only one-fifth of the gas or water permeability of the solid stock can be used if the hollow form be adopted. Under comparable conditions, the time to incidence of electrolyte leakage through the vent hole 12 in the cap H is longer by three-fold or more when the hollow electrode is used instead of a solid electrode of the same stock.

The lower resistance to gas venting of the hollow electrode is due to the shorter path which the gas must travel in passing through the electrode stock. The axial passage or hole in the electrode also functions as a trap for electrolyte, which is slowly forced into the electrode under pressure after the gas space G has become full. The electrolyte can evaporate as rapidly as it comes to the surface of the passage or hole 40 or 42 in the electrode C or C', respectively, leaving a porous layer of crystals. If the electrolyte reaches the inner surface of the electrode faster than evaporation takes place, it can spread over such inner surface without being forced out through the vent hole 12. In any event, it takes several times longer for leakage to occur through the vent hole in the cap H when a hollow inner electrode is used in the cell. This element of time can under various conditions be very critical with respect to controlling the overall safety factor of the cell against leakage. This arises from the fact that unless adequate venting means is provided or develops at some other point, the internal pressure developed with a solid electrode frequently produces leakage at such electrode or causes serious mechanical rupture at some point in the cell, prior to the incidence of any leakage controlled by the effectiveness of the side wall construction here involved.

With the described invention, the total available pressure relieving volume is increased 30% or more with no decrease in the amount of the active cell ingredients. Furthermore, the extra cellular expansion space is distributed in such a manner around the zinc electrode that it is particularly effective in retaining liquid by-products of cell discharge which are expelled through perforations in the zinc side wall. The provision of a waterproof or electrolyte-proof film around the zinc side wall, and of the metal cap K and the hollow eelectrode, inhibits loss of moisture from the cell through perforations which normally occur in the zinc can during its useful life. This makes possible the use of a zinc electrode with a thinner side wall, thereby resulting in zinc economy. If desired, perforations may be made in the zinc side wall, preferably adjacent the gas space G and below the partition 17 as shown at 50 in Fig. 1, in order to provide for controlled leakage of material from the cell, thereby controlling the points at which such leakage passes from the gas space G into the expansion space A.

Reduced tendency of the cell to leak is also made possible by increase in the total volume of the possible space into which gas or electrolyte may flow, since the greater the volume of such space the less the tendency to leak. In a construction like that illustrated in which an electrolyte-proof space is provided outside the zinc, any one or more of the following features singly or together contribute to delay in leakage tendency after the electrolyte material has penetrated into the exudant chamber and to reduction or elimination of the tendency for the sealing material to be ruptured or for tensional stress to exist in the zinc due to internal pressure:—the gas vent, the space G, and the holes 50 in the zinc permitting pressure to be equalized on opposite faces of the zinc.

While several embodiments of the invention have been described in order to illustrate the application of the principles of the invention, it should be understood that the invention may be otherwise embodied without departing from the scope thereof.

What is claimed is:

1. A galvanic cell comprising a normally liquid-tight container electrode; an inner electrode therein; a closure member secured to said container electrode and engaging said inner electrode; electrolyte material within said container electrode between the latter and said inner electrode; an outer wrapper surrounding said container electrode and uniformly spaced therefrom; an electrolyte-proof film disposed around said container electrode between the latter and said outer wrapper, said film being sealed to said container electrode at its upper and lower edges; and uniformly distributed spacing means surrounding said container electrode, engaging said film, and providing a large number of small voids between said container electrode and said outer wrapper, said voids being adapted to collect and retain cell exudate.

2. A galvanic cell as claimed in claim 1, in which said spacing means comprises a wide mesh woven material.

3. A galvanic cell as claimed in claim 1, in which said spacing means comprises thread spaced uniformly over the surface of said container electrode.

4. A galvanic cell as claimed in claim 1, in which said spacing means comprises a continuous layer of absorbent material of substantially uniform thickness.

5. A galvanic cell as claimed in claim 1, including a metal cap fitted tightly over the lower end of said container electrode.

6. A galvanic cell consisting of a normally liquid-tight container electrode; an inner electrode therein; a closure member secured to said container electrode and engaging said inner electrode; electrolyte material within said container electrode between the latter and said inner electrode; spacing material uniformly disposed around the outer surface of said container electrode, said spacing material providing a large number of voids adapted to collect and retain cell exudate; and an electrolyte-proof film enclosing said spacing material and sealed to said container electrode at the upper and lower edges thereof.

7. A galvanic cell consisting of a normally liquid-tight container electrode; an inner electrode therein; a closure member secured to said container electrode and engaging said inner electrode; electrolyte material disposed in said container electrode between the latter and said inner electrode; uniformly thick spacing material distributed uniformly over a substantial portion of the external surface of said container electrode and providing a large number of small voids adapted to collect and retain cell exudate; a strip of paper enclosing said spacing material; and a film of electrolyte-proof material on the internal surface of said paper and engaging said spacing material, said film being sealed to the axial extremities of said container electrode.

8. A galvanic cell comprising a normally liquid-tight container electrode; an inner electrode therein; a closure member secured to said container electrode and engaging said inner electrode; electrolyte material in said container electrode between the latter and said inner electrode; a sleeve of electrolyte-proof material surrounding said container electrode and sealed at its ends to the ends of said container electrode; and means spacing said sleeve a uniform distance from said container electrode and providing a large number of small voids adapted to collect and retain cell exudate.

9. A galvanic cell consisting of, in combination, a normally liquid-tight container electrode; an inner electrode therein; electrolyte material within said container electrode between the latter and said inner electrode; an outer wrapper for said container electrode; spacing material uniformly distributed over the external surface of said container electrode and within said wrapper, said spacing material providing a large number of small voids adapted to collect and retain cell exudate; and a film of electrolyte-proof material disposed between said container electrode and said wrapper and sealed to the extremities of said container electrode.

10. A galvanic cell as claimed in claim 9, in which said film is a material selected from the group comprising polymers and copolymers of vinyl derivatives.

11. A galvanic cell as claimed in claim 9, in which said film comprises elastic material.

12. A method of sealing a galvanic cell of the type including a container electrode, an inner electrode therein, and electrolyte material disposed in said container electrode between the latter and said inner electrode; which comprises providing a film of electrolyte-proof material; uniformly distributing spacing material over said film in such manner as to provide a large number of voids adapted to collect and retain cell exudate; applying a band of adhesive material to each end of said container electrode; rolling the banded cell over said film to adhere the film to the container electrode; and sealing said film only to each end of said cell.

13. A method of sealing a galvanic cell of the type including a container electrode, an inner electrode therein, electrolyte material within said container electrode between the latter and said inner electrode, and an outer wrapper for said container electrode; which comprises uniformly distributing spacing material around the external surface of said container electrode and within said wrapper, said spacing material providing a large number of voids adapted to collect and retain cell exudate; disposing a film of electrolyte-proof material between said container electrode and said wrapper; and sealing said film only to the extremities of said container electrode.

14. In the method claimed in claim 13, the step of applying said film to the inner surface of said wrapper.

15. In the method claimed in claim 13, the step of securing said spacing material to said film.

16. A method of sealing a galvanic cell of the type including a container electrode, an inner electrode therein, electrolyte material within said container electrode between the latter and said inner electrode, and an outer wrapper for said container electrode; which comprises shrinking a sleeve of elastic material over said container electrode and within said outer wrapper; sealing the ends of said sleeve only to the ends of said container electrode; and uniformly distributing uniformly thick spacing material between said container electrode and said outer wrapper, said spacing material providing a large number of voids adapted to collect and retain cell exudate.

ROLAND L. GLOVER.